3,037,006
N - ACRYLOXYALKYL - OXAZOLIDINES AND N-ACRYLOXYALKYL - TETRAHYDRO - 1,3 - OXAZINES, THEIR POLYMERS, PREPARATION THEREOF, AND DERIVATIVES THEREOF

Elinor M. Hankins, Philadelphia, and William D. Emmons, Huntingdon Valley, Pa., assignors to Rohm & Haas Company, Philadelphia, Pa., a corporation of Delaware No Drawing. Filed July 5, 1960, Ser. No. 40,562
21 Claims. (Cl. 260—80.5)

This application concerns new compounds which may be generally designated as acryloxyalkyl-oxazolidines or acryloxyalkyl-tetrahydro-1,3-oxazines. It is also concerned with the polymers thereof, the preparation of the monomers and their polymers, and noxel hydroxyalkylaminoalkyl monomers and polymers derivable from the aforesaid oxazolidines and tetrahydrooxazines.

The new compounds are those having the formula

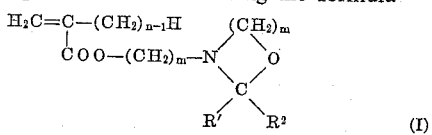

where $n$ is an integer having a value of 1 to 2,
$m$ is an integer having a value of 2 to 3,
$R'$, when not directly joined to $R^2$, is selected from the group consisting of hydrogen, phenyl, benzyl, and $(C_1-C_{12})$ alkyl alkyl groups, $R^2$, when not directly joined to $R'$, is selected from the group consisting of hydrogen and $(C_1-C_4)$ alkyl groups, and $R'$ and $R^2$, when directly joined together, form a 5- to 6-carbon ring with the attached carbon atom of the ring in the formula, i.e., $R'$ and $R^2$, when joined together, are selected from the group consisting of pentamethylene and tetramethylene.

The compounds designated hereinabove may be prepared by the transesterification of an ester of acrylic acid or methacrylic acid such as methyl methacrylate or methyl acrylate with an N-hydroxyalkyloxazolidine of the formula

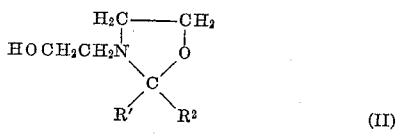

or an N-hydroxypropyl-tetrahydro-1,3-oxazine of the formula

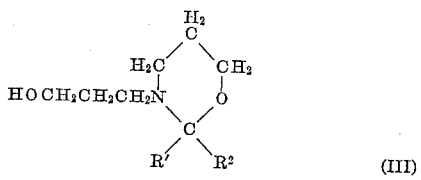

in both of which formulas the symbols are as defined hereinabove. The reaction is effected under alkaline conditions in the presence of about ½% to 10%, and preferably 1 to 5%, by weight, based on the weight of the starting alcohol, of a tetraalkyl titanate such as the tetraisopropyl or tetrabutyl titanate. No solvent is needed. While the starting materials may be employed in stoichiometrically equivalent amounts, it is preferred that the ester be employed in excess. The alcohol liberated during the transesterification is removed by azeotropic distillation of a mixture of the alcohol and the starting monomeric ester, such as methyl methacrylate or methyl acrylate. It is desirable that a polymerization inhibitor be employed such as para-hydroxydiphenylamine or diphenylphenylenediamine. The reaction is generally carried out at temperatures of about 100° to 130° C. and the completion of the reaction can be determined by measuring the amount of alcohol removed and thereby determining when the theoretical amount of alcohol liberated has been taken out of the system by distillation.

Instead of using tetraalkyl titanate, the transesterification may be carried out in the presence of an alkali metal hydroxide, the amount thereof varying from 0.2% to 5%, and preferably 1 to 3%, based on the weight of the starting alcohol. Whereas the use of tetraalkyl titanate is applicable to the preparation of both acrylates and methacrylates, the alkali metal alkoxide system is applicable primarily for the transesterification of methacrylates. Sodium methoxide or ethoxide as well as the potassium and lithium analogs may be employed. In this system, the ester and oxazolidine or tetrahydrooxazine are mixed and a solution of the alkoxide in an alcohol such as methanol is added gradually. No additional solvent is needed, the ester itself serving this purpose. The temperature may be from 100° to 140° C. and is preferably not over 130° C.

The hydroxyalkyl compounds of Formulas II and III used to react with the esters may be obtained by the reaction of diethanolamine or dipropanolamine with an aldehyde or ketone, particularly those listed below:

| | |
|---|---|
| Formaldehyde | Acetone |
| Acetaldehyde | Methyl ethyl ketone |
| Propionaldehyde | Methyl propyl ketone |
| Butyraldehyde | Methyl isobutyl ketone |
| Benzaldehyde | Methyl isopropyl ketone |
| Cyclopentanone | Diisobutyl ketone |
| Cyclohexanone | |

The preparation of the N-hydroxyalkyl-oxazolidines and tetrahydro-1,3-oxazines is well known in the art and their preparation is no part of the present invention. In general, they are prepared by reaction of the di(hydroxyalkyl)amines with the ketones or aldehydes in bulk or within an inert solvent such as xylene, benzene, or toluene, adapted to form an azeotrope with the water to aid in its removal. The mixture is heated to a temperature of 100° C. or higher depending on the pressure in order to distill water.

The monomers of the present invention having Formula I hereinabove are colorless liquids and are reasonably stable at room temperature although if they are to be stored over long periods of time, it is advisable to maintain them under refrigeration. These monomers are characterized by two points of reactivity, one being the double bond in the acrylyl portion of the molecule by virtue of which the compounds are adapted to polymerize by the typical vinyl addition process to form linear polymers and copolymers. The cyclic radical is hydrolyzable under acid conditions to form an hydroxyalkylamine salt radical. This hydrolysis may be effected on a polymer of the compound of Formula I.

The monomeric compounds of Formula I may be suspended in an aqueous medium preferably in particulate form and upon acidification of the medium such as by means of acetic acid, phosphoric acid, sulfuric acid, and the like, the monomer is hydrolyzed to a secondary amine which forms a salt of the acid present and which carries an hydroxyalkyl group on the nitrogen atom. This salt is polymerizable in aqueous systems. Thus, it may be dissolved in water and polymerized by water-soluble initiators or catalysts such as ammonium persulfate optionally with a reducing agent such as potassium metabisulfite in a redox system. Such polymers have high molecular weight and are applicable for imparting wet-strength to paper and for the flocculation of suspended matter in aqueous media to facilitate filtration, settling, and/or decantation. Copolymers which are oil-soluble, such as those with a $(C_8-C_{18})$alkyl acrylate or methacrylate, are useful as oil additives, having good dispersant qualities and serving also as a pour-point depressant.

The polymers and copolymers of the compounds of Formula I may be prepared by either a bulk, a solvent, or an aqueous emulsion technique using organic solvents such as acetone, dioxane, dimethylformamide, and acetonitrile, and azo catalysts such as diazodiisobutyronitrile and dimethyl-$\alpha,\alpha'$-azodiisobutyrate. The proportion of azo catalyst or initiator may be between 0.1% and 5% and is preferably between about 0.5% and 1.5%, on the weight of the total polymerizable materials.

The compounds of Formula I can be copolymerized with various other ethylenically unsaturated monomers, and especially the monoethylenically unsaturated monomers adapted to produce linear copolymers. Thus, copolymers may be made containing from about ½% to 99.5% by weight of a compound of Formula I with at least one of the following monomers: vinyl acetate, acrylonitrile, acrylamide, methacrylamide, styrene, vinyltoluene, vinylidene chloride, vinyl chloride, vinyl laurate, esters of acrylic acid or methacrylic acid having from 1 to 18 carbon atoms in the alcohol moiety such as methyl methacrylate, methyl acrylate, ethyl acrylate, butyl acrylate of methacrylate, cyclohexyl acrylate or methacrylate, 2-ethylhexyl acrylate or methacrylate, dodecyl acrylate or methacrylate, and octadecyl acrylate or methacrylate.

The polymers and copolymers may be used in the formation of coatings, impregnants, and adhesives for paper, textiles, leather, wood, and metals. Copolymers containing from 5 to 25% by weight of the unsaturated monomers of the invention can be mixed with polyepoxides for the production of insoluble and infusible cross-linked coatings. The copolymers may be employed in conjunction with other polymeric material for the production of special compositions for special uses. For example, polymerization of an amine of Formula I in the presence of glue results in a polymer which is soluble in water and serves efficiently for the flocculation of suspended matter of either organic or inorganic material in aqueous media to facilitate the filtration or the settling and decantation of the system. Emulsion polymers of a compound of Formula I are useful also for the binding of pigments, for the stabilization of wool fabrics against shrinkage on laundering, and for the binding of fibers in non-woven fabrics. For this purpose, they may be used in conjunction with a polyepoxide of water-soluble or dispersible character. The bonded non-woven fabrics are not discolored by chlorine-bleaching or ironing.

Examples of epoxides that may be employed include both water-dispersible and/or organic solvent-soluble types such as dihydrodicyclopentadienyl ethers having the general formula $$O'=C_{10}H_{13}-O-R-O-C_{10}H_{13}=O' \quad (IV)$$

in which $C_{10}H_{13}$ is the radical of exo-dihydrodicyclopentadiene, the two O' groups are oxygen atoms which together with two adjacent carbon atoms in the $C_{10}H_{13}$ radicals form oxirane rings, and R is either (a) an alkylene group of 2 to 12 carbon atoms or (b) a radical of an etherified polyalkylene glycol, which radical has the formula $$(R'-O-)_xR'$$

in which R' is an alkylene group of 2 to 4 carbon atoms and $x$ is an integer having a value of 1 to 8 inclusive. These compounds and their production are described in U.S. Patent 2,543,419. There may also be used the "ethoxyline resins" available under the trade names of Epon or Araldite resins. They are polyether derivatives of a polyhydric phenol containing epoxy groups and may be prepared by effecting reaction between a polyhydroxy phenol or alcohol, for example, hydroquinone, resorcinol, glycerine, or condensation products of phenols with ketones, for instance, bis-(4-dihydroxydiphenyl)-2,2-propane, and epichlorohydrin. For example, the reaction of epichlorohydrin with bis-(4-hydroxyphenyl)-2,2-propane may be formulated as follows:

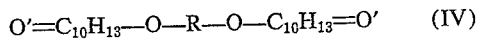

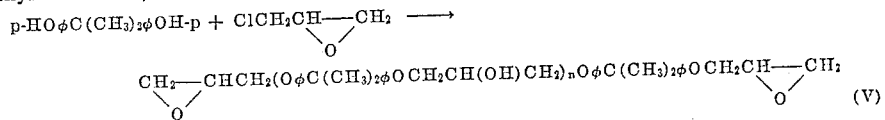

where $\phi$ is the phenylene group and $n$ has an average value varying from around zero to about 7. These resins may be made by the method disclosed in 2,324,483, 2,444,333, British Patents 518,057 and 579,698. Many of these ethoxyline resins are sold under the name of Epon resins by Shell Chemical Corporation or Araldite resins by the Ciba Company. Data on the Epon resins are given in the table below:

TABLE I

| Epon No. | Epoxide Equivalent | Approximate Esterification Equivalent | M.P., °C. |
| --- | --- | --- | --- |
| RN-34 | 225-290 | 105 | 20-28 |
| RN-48 | 192 | 80 | 9 |
| 1064 | 300-375 | 105 | 40-45 |
| 1062 | 140-165 |  | Liquid |
| 1004 | 905-985 | 175 | 97-103 |
| 1007 | 1,600-1,900 | 190 | 127-133 |
| 1009 | 2,400-4,000 | 200 | 145-155 |
| 1001 | 450-525 | 130 | 64-76 |

Also, there may be used polyepoxides of the formula

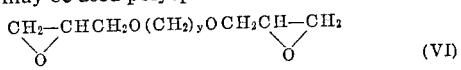

where $y$ is a number having an average value of 2 to 4. Epon 562 is of this type, is liquid at normal room conditions, and has an "Epoxide Equivalent" value of 140-165. Also, a diepoxide or triepoxide of glycerol may be used. These aliphatic polyepoxides may be prepared in the known fashion as described, for example in U.S. Patents 2,730,427 or 2,752,269. The preferred polyepoxides are those having average molecular weights of about 250 to 1,000.

The polymers of a compound of Formula I can be treated with an acid such as acetic acid or phosphoric acid while suspended in water to effect hydrolysis of the cyclic group to open it and form a secondary amine carrying a hydroxyalkyl group. This is a very rapid reaction even at room temperature but, in some cases, it may be accelerated by raising the temperature. The polymers thereby obtained have uses similar to those of the unhydrolyzed polymers. They are useful as flocculant aids for the making of adhesives and coatings of thermosetting character, especially when mixed with epoxides, binders for non-woven fabrics and for pigments in the pigment-dyeing and printing of textiles, and as lubricating oil additives for improving the viscosity index and pour-point characteristics. They may be used for the stabilization of wool against shrinkage on washing and for the imparting of wet-strength to paper.

The following examples are illustrative of the invention and the parts and percentages therein are by weight unless otherwise indicated.

EXAMPLE 1

(a) *N-(β-Hydroxyethyl)Oxazolidine*

A glass reaction vessel equipped with stirrer, thermometer, and condenser fitted through a water trap was charged with 315 grams (3 moles) of diethanolamine and 500 grams of toluene. One hundred and five grams (3.15 moles) of paraformaldehyde (90%) was weighed out and about one-third was added to the amine solution. The resulting mixture was stirred and heated gradually to 92° C. while adding the formaldehyde, the addition being finished in about 70 minutes. The mixture was heated to boiling and water was separated. In 4 hours a total of 63 ml. of water was removed. Toluene was then distilled off at reduced pressure. The residue was distilled at high vacuum and the colorless liquid, N-(β-hydroxyethyl)-oxazolidine, was collected at 79° to 80° C. (2.2–2.5 mm. Hg). There was obtained 309.8 grams (85.4% yield), $n_D^{25}$ 1.4783.

Analysis.—Calcd. percent for $C_5H_{11}NO_2$: C, 51.26; H, 9.47; N, 11.96. Found percent: C, 51.07; H, 9.57; N, 11.91, 11.85. Titr. No. 11.4

(b) Oxazolidinylethyl Methacrylate

A glass reaction vessel equipped with stirrer, thermometer, dropping burette for alcoholic sodium methoxide solution, and under a 35 cm. helix packed column fitted with an automatic take-off distilling head set to take off to 70° C. was charged with 234 grams (2 moles) of N-(hydroxyethyl)oxazolidine, 400 grams (4.0 moles) of methyl methacrylate, and 18.5 grams (0.1 mole) of p-hydroxydiphenylamine. The mixture was heated with stirring to 98° C. and 2.0 ml. of a 25% solution of sodium methoxide in methanol was added. In 15 minutes the pot temperature was raised to 106° C. and methanol-methyl methacrylate started to distill over at 66° C. Additional sodium methoxide catalyst solution was added in 0.5 ml. increments at 10-minute intervals while the pot temperature was raised to 116° C. A total of 8.0 ml. catalyst was added. Then the mixture was heated 70 minutes longer until no more azeotrope came over. A total of 92.0 grams of distillate, $n_D^{20}$ 1.3612, was collected; this contained 57.1 grams of methanol.

After addition of 20 grams of p-hydroxydiphenylamine, the excess methyl methacrylate was distilled off at reduced pressure at a bath temperature of 60° to 68° C. The residue was distilled at high vacuum and 216 grams (58.5% yield) of oxazolidinylethyl methacrylate was collected; boiling point 95° C./1.2 mm. Hg to 100° C./0.3 mm. Hg. There was 173.4 grams of residue containing some popcorn polymer. The product was redistilled after addition of 10 grams of inhibitor and 115.4 grams of oxazolidinylethyl methacrylate, boiling range 83° to 87° C./0.5 mm. Hg, $n_D^{25}$ 1.4684, was collected.

Analysis.—Calcd. percent for $C_9H_{15}NO_3$: C, 58.36; H, 8.16; N, 7.56. Br. No. 86.30. Total percent $CH_2O$, 16.3. Found percent: C, 59.12, 58.91; H, 8.25, 8.34; N, 7.94, 7.68. Br. No. 86.

EXAMPLE 2

Oxazolidinylethyl Acrylate

The procedure of Example 1(b) was followed with 234 grams (2.0 moles) of N-(β-hydroxyethyl)oxazolidine, 500 grams (5.0 moles) of ethyl acrylate, 15 grams of diphenylphenylenediamine, and 15 grams of tetraisopropyl titanate (instead of sodium methoxide). The ethanol-ethyl acrylate azeotrope was taken off up to 81° C. After removal of ethanol and ethyl acrylate, vacuum distillation gave oxazolidinylethyl acrylate as a colorless liquid, boiling range 70°–73° C./0.2 mm. Hg.

EXAMPLE 3

Phenyloxazolidinylethyl Methacrylate 2-phenyl-3-(β-hydroxyethyl)oxazolidine, prepared in good yield from benzaldehyde and diethanolamine (as in Example 1(a)), was converted to the methacrylate by transesterification with methyl methacrylate as in Example 1(b), except that 15 grams of tetraisopropyl titanate was used as the catalyst instead of sodium methoxide.

EXAMPLE 4

2-methyl-3-(β-hydroxyethyl)oxazolidine was prepared as in Example 1(a) by reacting acetaldehyde with diethanolamine. The product was converted to the acrylate by transesterification by the procedure of Example 2.

EXAMPLE 5

2 - benzyl - 3 -(γ - hydroxypropyl) tetrahydro 1,3-oxazine was prepared as in Example 1(a) by reacting phenylacetaldehyde with di(γ-hydroxypropyl)amine. The product was converted to the acrylate by transesterification by the procedure of Example 2.

EXAMPLE 6

(a) 3-(γ-Hydroxypropyl)-Tetrahydro-1,3-Oxazine

The condensation by the procedure of Example 1(a) of di(γ-hydroxypropyl)amine with paraformaldehyde in the presence of toluene and with removal of water yielded 3-(γ-hydroxypropyl)-tetrahydro-1,3-oxazine.

(b) 3(γ-Methacryloxypropyl)-Tetrahydro-1,3-Oxazine

Transesterification of methyl methacrylate with 3-(γ-hydroxypropyl)-tetrahydro-1,3-oxazine by the procedure of Example 1(b) but using tetraisopropyl titanate (instead of sodium methoxide) gave 3-(γ-methacryloxypropyl)-tetrahydro-1,3-oxazine.

EXAMPLE 7

(a) 3-(β-Hydroxyethyl)-2,2-Pentamethylene-Oxazolidine

The condensation as in Example 1(a) of 105 grams (1 mole) of diethanolamine with 107.8 grams (1.1 mole) of cyclohexanone with removal of water yielded, after distillation, 3 - (β - hydroxyethyl) - 2,2 - pentamethylene-oxazolidine, boiling point 165°–170° C./24 mm. Hg.

(b) 3-(β)-Methacryloxyethyl)-2,2-Pentamethylene-Oxazolidine

Tetraisopropyl titanate catalyzed transesterification of 3 - (β - hydroxyethyl) 2,2 - pentamethylene-oxazoline with methyl methacrylate in the presence of diphenylphenylenediamine inhibitor by the procedure of Example 3 gave 3-(β - methacryloxyethyl) - 2,2 - pentamethylene-oxazolidine, boiling point 115°–120° C./0.5 mm. Hg.

EXAMPLE 8

3-(β-Methacryloxyethyl)-2-Methyl-2-Propyl-Oxazolidine

3 - (β - hydroxyethyl) - 2 - methyl - 2 - propyl - oxazolidine, prepared as in Example 7 from 2-pentanone and diethanolamine by the procedure of Example 1(a), was transesterified with methyl methacrylate using sodium methoxide in methanol as catalyst and p-hydroxyphenylenediamine inhibitor by the procedure of Example 1(b). There was obtained 3-(β-methacryloxyethyl)-2-methyl-2-propyl-oxazolidine.

EXAMPLE 9

A mixture of 9.25 grams (0.05 mole) of oxazolidinylethyl methacrylate and 15 grams of water was cooled to 0° C. To this was slowly added 3.0 grams (0.05 mole) of acetic acid. The solution (pH 5.0) was diluted to 30 grams and nitrogen was bubbled in slowly as the temperature was allowed to rise. At 13.5°, 0.1 gram of ammonium persulfate and 0.05 gram of sodium hydrosulfite were added. The temperature rose to 28° C. in 18 minutes and stayed at 25°–28° C. for the rest of the polymerization. It was necessary to add water slowly in 10-gram increments as the viscosity of the polymerization mixture increased. After 4½ hours, the resulting product was a solution of the redox homopolymer. There was obtained 143.0 grams with a viscosity of 1.4 poises at 25° C. and a determined solids content of 6.43%.

Paper sheets were prepared with bleached sulfite pulp (480 ml. Canadian Freeness) containing 2% of the polymer, on the weight of fiber, added to the beater. The wet strengths were at pH 4.0, 6.0, and 9.0, respectively.

TABLE II

| pH (of pulp) | Wet strength (lbs./inch width) | | |
|---|---|---|---|
| | 1 day age | 10 days age | 28 days age |
| 4.0 | 1.3 | 2.0 | 1.8 |
| 6.0 | 2.8 | 2.9 | 3.2 |
| 9.0 | 2.1 | 2.6 | 3.0 |
| Control | 0.2 | 0.2 | 0.2 |

EXAMPLE 10

A mixture of 1 part of oxazolidinylethyl methacrylate, 3 parts of acrylonitrile, and 6 parts of ethyl acrylate was copolymerized in a solution formed of 15 parts of water containing ¼ part of sodium lauryl sulfate, 2 parts of acetic acid, 0.1 part of ammonium persulfate, and 0.05 part of sodium hydrosulfite. After completion of polymerization, a latex containing about 40% solids was obtained. The composition was diluted with water to 20% solids and applied to paper and leather to provide clear, glossy coatings thereon.

EXAMPLE 11

A mixture of 1 part of oxazolidinylethyl acrylate, 85 parts of acrylonitrile, and 14 parts of n-butyl acrylate were dissolved in 300 parts of dimethylformamide. Four parts of benzoyl peroxide were added and the temperature of the mixture was controlled to maintain it at about 65° C. After eight hours, the solution was cast on cellophane and allowed to air-dry. The films were smooth, clear, and glossy. They showed improved capacity for dyeing as compared to polyacrylonitrile films.

EXAMPLE 12

A mixture of 5 parts of phenyloxazolidinylethyl methacrylate, 15 parts of vinyltoluene, 10 parts of vinyl acetate, and 70 parts of ethyl acrylate was copolymerized to form a latex by the procedure of Example 10. An aqueous paste of a mixture of 12.5 parts blue copper phthalocyanine pigment and 100 parts of titanium dioxide was mixed with 300 parts of the copolymer latex (40% solids) yielding a blue pigmented coating composition which was useful as a water-base paint. Flexible, tough coatings were obtained by application to masonry, wood, plaster, and metal panels.

EXAMPLE 13

(a) A mixture of 5 parts of 3-(γ-methacryloxypropyl)-tetrahydro-1,3-oxazine, 2.5 parts of N-methylol-acrylamide, 1 part of acrylamide, 11.5 parts of vinyltoluene, and 80 parts of ethyl acrylate was copolymerized to form a 40% solids latex as in Example 10. The latex was applied to a non-woven fabric formed of carded rayon fibers to provide 50% of the copolymer on the weight of fibers, yielding, after drying and heating at 240° F. for 30 minutes, a bonded fabric which was resistant to washing and dry-cleaning by perchloroethylene.

(b) Part (a) was repeated replacing the oxazine with the same amount of 2-benzyl-3-(γ-acryloxypropyl)-tetrahydro-1,3-oxazine with similar results.

(c) Part (a) was repeated replacing the oxazine with the same amount of 2-methyl-3-(β-acryloxyethyl)-oxazolidine with similar results.

EXAMPLE 14

A mixture of 11 grams of 3-(β-methacryloxyethyl)-2,2-pentamethylene-oxazolidine (of Example 7(b)), 89 grams of acrylonitrile, 200 grams of dimethylformamide, 5 grams of mercaptoethanol, 0.1 gram of dimethyl azodiisobutyrate is heated at 65° C. under nitrogen for 16 hours. The polymerization mixture may be poured into acetone to precipitate the polymer, or extruded through a 40-hole spinneret (each hole of 0.025 inch diameter) into an aqueous bath to form filaments which are stretched 100% and dried. The filaments show improved dyeing characteristics as compared to poly(acrylonitrile) especially to acid dyes.

EXAMPLE 15

A similar procedure is followed with 10 grams of the 3-(β-methacryloxyethyl)-2-methyl-2-propyl-oxazolidine (Example 8) prepared as in Example 1(b), 87 grams of vinyl acetate, 3 grams of acrylamide, 220 grams of dimethylformamide, and 4.5 grams of dimethyl azodiisobutyrate. There is obtained 97 grams of a white solid copolymer.

EXAMPLE 16

A solution containing 5 grams of oxazolidinylethyl methacrylate (Example 1(b)), 95 grams of a mixture of lauryl and myristyl methacrylates, 250 grams of toluene, 0.5 gram of mercaptoethanol, and 1.5 gram of dimethyl azodiisobutyrate is heated at 65° C. under nitrogen for 16 hours. The polymerization mixture is mixed with a Mid-Continent lubricating oil in a concentration of 0.5% and serves to depress the pour-point and reduce the tendency to form carbon deposits.

EXAMPLE 17

A solution containing 5 grams of oxazolidinylethyl acrylate (of Example 2), 95 grams of a mixture of lauryl and myristyl methacrylates, 250 grams of toluene, 0.5 gram of mercaptoethanol, and 1.5 gram of dimethyl azodiisobutyrate is heated at 65° C. under nitrogen for 16 hours. The polymerization mixture is mixed with a Mid-Continent lubricating oil in a concentration of 0.5% and serves to depress the pour-point and reduce the tendency to form carbon deposits.

We claim:

1. As new compositions of matter, compounds selected from the group consisting of those having the Formula I:

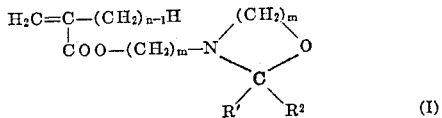

where $n$ is an integer having a value of 1 to 2, $m$ is an integer having a value of 2 to 3, $R'$ and $R^2$ are selected from the group consisting of (1) separate groups selected individually from (a) hydrogen, phenyl, benzyl, and $(C_1-C_{12})$ alkyl groups in the case of $R'$ and (b) hydrogen and $(C_1-C_4)$ alkyl groups in the case of $R^2$ and (2) a single group selected from the group consisting of pentamethylene and tetramethylene which together with the carbon atom to which the single group is attached forms a carbocyclic group.

2. A solid polymer of polymerizable monoethylenically unsaturated molecules comprising a monomeric compound as defined in claim 1.

3. A solid copolymer of 0.5 to 99.5% by weight of at least one monomeric compound as defined in claim 1 with 99.5% to 0.5% by weight of at least one other copolymerizable monoethylenically unsaturated monomer.

4. Oxazolidinylethyl methacrylate.

5. Oxazolidinylethyl acrylate.

6. 3-(γ-methacryloxypropyl)-tetrahydro-1,3-oxazine.

7. 3-(β-methacryloxyethyl)-2,2-pentamethylene-oxazolidine.

8. 3-(β-methacryloxyethyl)-2-methyl-2-propyl-oxazolidine.

9. A solid polymer of polymerizable monoethylenically unsaturated molecules comprising oxazolidinylethyl methacrylate.

10. A solid polymer of polymerizable monoethylenically unsaturated molecules comprising oxazolidinylethyl acrylate.

11. A solid polymer of polymerizable monoethylenically unsaturated molecules comprising 3-(γ-methacryl-oxypropyl)-tetrahydro-1,3-oxazine.

12. A solid polymer of polymerizable monoethylenically unsaturated molecules comprising 3-(β-methacryloxyethyl)-2,2-pentamethylene-oxazolidine.

13. A solid polymer of polymerizable monoethylenically unsaturated molecules comprising 3-(β-methacryloxyethyl)-2-methyl-2-propyl-oxazolidine.

14. A solid copolymer of 0.5 to 99.5% by weight of oxazolidinylethyl methacrylate with 99.5–0.5% by weight of a monomeric compound selected from the group consisting of the amides, nitriles and esters of an acid selected from the group consisting of acrylic acid and methacrylic acid.

15. A solid copolymer of 0.5% to 99.5% by weight of oxazolidinylethyl methacrylate with 99.5% to 0.5% by weight of at least one ester of an acid of the formula

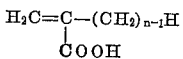

wherein $n$ is an integer having a value of 1 to 2, and a saturated aliphatic monohydric alcohol having 1 to 18 carbon atoms.

16. A solid copolymer of 0.5 to 99.5% by weight of oxazolidinylethyl methacrylate with acrylonitrile and at least one ester of an acid of the formula

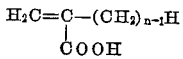

wherein $n$ is an integer having a value of 1 to 2, and a saturated aliphatic monohydric alcohol having 1 to 18 carbon atoms.

17. A method which comprises mixing (1) an ester of an acid of the formula

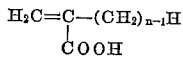

where $n$ is an integer having a value of 1 to 2, and an alcohol having 1 to 12 carbon atoms with (2) an N-hydroxyalkyl compound selected from the group consisting of those having the formula

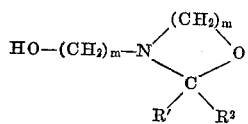

wherein $m$ is an integer having a value of 2 to 3, R′ and R² are selected from the group consisting of (1) separate groups selected individually from (a) hydrogen, phenyl, benzyl, and $(C_1-C_{12})$ alkyl groups in the case of R′ and (b) hydrogen and $(C_1-C_4)$ alkyl groups in the case of R² and (2) a single group selected from the group consisting of pentamethylene and tetramethylene which together with the carbon atom to which the single group is attached forms a carbocyclic group, and heating the mixture under alkaline conditions at a temperature of about 100° to 130° C. to effect transesterification of the ester with the aforesaid compound.

18. A process as defined in claim 17 in which the reaction is effected in contact with about ½ to 4% by weight of a tetraalkyl titanate, the weight thereof being based on the weight of reagents.

19. A process which comprises reacting methyl methacrylate and an N-hydroxyalkyl compound having the formula

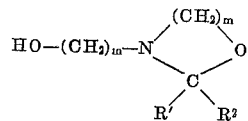

wherein $m$ is an integer having a value of 2 to 3, R′ and R² are selected from the group consisting of (1) separate groups selected individually from (a) hydrogen, phenyl, benzyl, and $(C_1-C_{12})$ alkyl groups in the case of R′ and (b) hydrogen and $(C_1-C_4)$ alkyl groups in the case of R² and (2) a single group selected from the group consisting of pentamethylene and tetramethylene which together with the carbon atom to which the single group is attached forms a carbocyclic group, in contact with an alkali metal alkoxide at a temperature of about 100° to 140° C.

20. A process which comprises hydrolyzing a compound having the formula

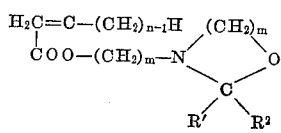

where $n$ is an integer having a value of 1 to 2, $m$ is an integer having a value of 2 to 3, R′ and R² are selected from the group consisting of (1) separate groups selected individually from (a) hydrogen, phenyl, benzyl, and $(C_1-C_{12})$ alkyl groups in the case of R′ and (b) hydrogen and $(C_1-C_4)$ alkyl groups in the case of R² and (2) a single group selected from the group consisting of pentamethylene and tetramethylene which together with the carbon atom to which the single group is attached forms a carbocyclic group, in an acid medium.

21. A process comprising the step of hydrolyzing a polymer of at least one compound having the formula

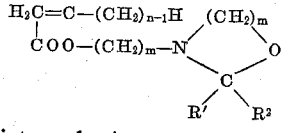

where $n$ is an integer having a value of 1 to 2, $m$ is an integer having a value of 2 to 3, R′ and R² are selected from the group consisting of (1) separate groups selected individually from (a) hydrogen, phenyl, benzyl, and $(C_1-C_{12})$ alkyl groups in the case of R′ and (b) hydrogen and $(C_1-C_4)$ alkyl groups in the case of R² and (2) a single group selected from the group consisting of pentamethylene and tetramethylene which together with the carbon atom to which the single group is attached forms a carbocyclic group, in contact with an acid.

References Cited in the file of this patent

UNITED STATES PATENTS 2,960,508    Croxall et al. _____ Nov. 15, 1960

UNITED STATES PATENT OFFICE
CERTIFICATE OF CORRECTION

Patent No. 3,037,006                           May 29, 1962

Elinor M. Hankins et al.

It is certified that error appears in the above identified patent and that said Letters Patent are hereby corrected as shown below:

Column 10, lines 22 to 29, and lines 41 to 46, the formulas should appear as shown below instead of as in the patent:

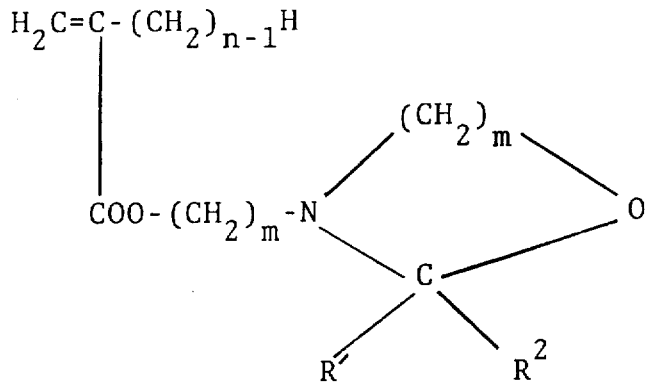

Signed and sealed this 9th day of December 1969.

(SEAL)
Attest:

EDWARD M. FLETCHER, JR.                      WILLIAM E. SCHUYLER, JR.
Attesting Officer                              Commissioner of Patents